United States Patent [19]

Plesa

[11] 4,392,304
[45] Jul. 12, 1983

[54] UNIVERSAL MANUAL GRAFTING DEVICE

[75] Inventor: Laszlo Plesa, Szentendre, Hungary

[73] Assignee: Aranykalasz Mgtsz, Rackeve, Hungary

[21] Appl. No.: 263,604

[22] Filed: May 14, 1981

[30] Foreign Application Priority Data

May 20, 1980 [HU] Hungary .................................. 1254

[51] Int. Cl.³ ............................................. A01G 1/06
[52] U.S. Cl. ...................................... 30/178; 30/184; 47/6
[58] Field of Search ................... 47/6, 7; 30/124, 241, 30/242, 178, 229, 208, 212, 182, 184; 81/355, 354, 353, 352

[56] References Cited

U.S. PATENT DOCUMENTS

| 219,403 | 9/1879 | Kingsbury | 30/178 |
| 229,040 | 6/1880 | Hoit | 30/178 |
| 432,056 | 7/1890 | Leavitt | 30/242 |
| 2,270,495 | 1/1942 | Bernay | 30/184 |
| 2,541,063 | 2/1951 | Hubbard | 30/184 X |

Primary Examiner—Jimmy C. Peters
Attorney, Agent, or Firm—Young & Thompson

[57] ABSTRACT

A hand tool for use in performing manual agricultural grafting, comprises a fixed and a movable handle pivotally connected to each other and having working portions extending beyond the pivot. A coil tension spring connects the first handle to the working portion of the second handle thereby tending to spread the handles apart. The spring is connected to the same point on the working portion of the second handle as is pivotally connected to one end of an arm whose other end is pivotally connected to a positioning fork that locates the stock to be cut. The positioning device slides in a groove on the working portion of the first handle toward and away from a cutting edge carried by the working portion of the first handle.

4 Claims, 2 Drawing Figures

UNIVERSAL MANUAL GRAFTING DEVICE

The invention relates to a manual universal grafting device, which can be well used in vineyards, orchards, in particular in sapling gardens and plantations, and also in gardens cultivating ornamental shrubbery or plants.

As it is well known, grafts are made in a traditional manner, manually. However, in larger areas surpassing the limits of individual gardening, this method became obsolete, uneconomical and unproductive. In order to be able to eliminate the utmost wearisome and labour intensive manual grafting process, several grafting devices have been developed, which can be used with good results and a high efficiency, in particular in vineyards. With these grafting devices on the understock and on the graft a negative and a positive profile, respectively, showing the shape of the Greek letter omega can be cut out, accordingly the pieces needed for preparing grafted shoots can be properly and jointlessly fitted to each other. By using said device, instead of pairing according to the English tongue-method—besides, the formation thereof requires specialized knowledge—pieces cut-off, to the easily joining omega-profile may be obtained; however, this device represents a stationary tool to be operated with a pedal, by the aid of which the grafts may be prepared with preselected grafts only. There has long been the demand to provide a handtool for the vineyardists enabling the work in the vineyards, on the spot. The same demand exists—even to an increased extent—on behalf of those who are working in orchards and gardens cultivating ornamental shrubbery and plants.

In the past grafting devices for gardeners were made, by the aid of which the pieces needed for the grafting procedure—the understock and the graft—were cut by means of a knife operating like pliers or scissors. However, said tool could enable the work only with the use of the traditional grafting knife and could not shorten the period needed for the complete grafting procedure, i.e. for the complete insertion of the pieces having been cut to a given profile. This work cannot be performed by means of the known handtools at all, since the pieces to be fitted can be cut only in accordance with the English tongue-method. However, accurate grafting requires the exact fitting of the plant parts having been cut with the knife and to be fixed already in course of fitting, since the delivery of the sap can be expected only with accurately fitted grafts. However, fitting and fixation are timeconsuming procedures, which can be performed only manually.

Accordingly, the task set for the universal manual grafting device lies in partly to facilitate the time-consuming and wearisome manual work, partly to eliminate and to prevent the preparation of faulty grafts. A further aim lies in to perform grafting in a productive manner and on the spot.

It is not necessary to emphasize the importance of productivity, since, as is well known, in every industrial branch—and agriculture does not represent an exception to the rule—high-grade mechanization is required in order to be able to substitute live labour, i.e., to obtain maximum productivity with the minimal expenditure of manual work.

Accordingly, by developing the universal manual grafting device according to the invention there has been provided a long-needed tool, by the aid of which manual work of the agricultural labourers could be considerably facilitated.

The universal character of the grafting device according to the invention may be appreciated from the fact that it can be expediently used for preparing all kinds of grafts, whether it is grape-vine, fruit or ornamental shrubbery. Due to the easy manageability graftlings may be prepared on tables in winter, or grafting may be performed in the spring in the vineyards on the spot, in addition to these greengrafting or propagation by cutting become also possible. The task set could be solved by using a grafting device to be actuated manually against a spring force, having been provided with knives with a U-profile arranged on arms to be moved on two hinging points.

The advantages, structure and mode of operation of the grafting device according to the invention will be described in detail by the aid of a preferred embodiment, by means of the accompanying drawings, wherein.

Figure 1:
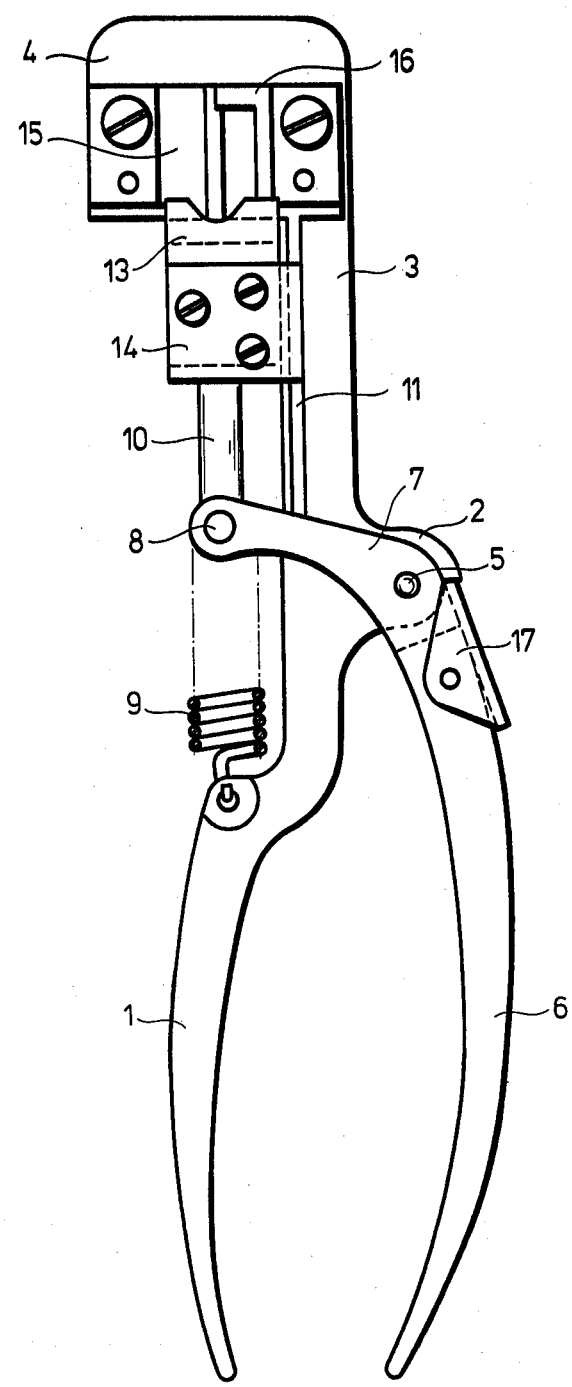
FIG. 1 is a side-view of the grafting-device.
Figure 2:
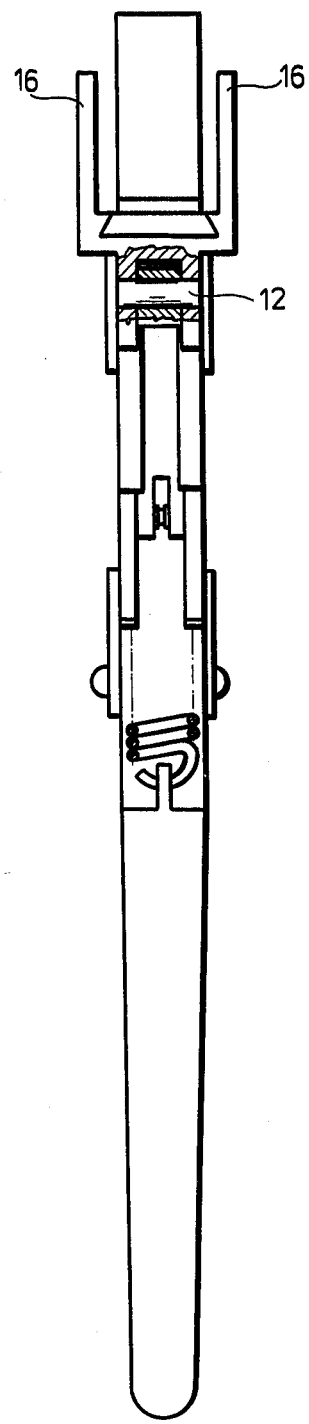
FIG. 2 is a view from the left of FIG. 1.

As can be seen in the figures, the stationary handle or part 1 of the grafting device is shaped as the shaft of any usual handtool. In relation to the handle the midpart is bent to the right, while in this range a projection 2 with a rounded-off contour has been formed. The upper portion of the stationary part 1 of the grafting device is formed by the vertical guide column 3 starting from the projection 2, which terminates at the top in the cutter holder head 4, having been bent in a U-form.

In the cam 2 of the stationary part 1 above the shaft a bore has been machined, into which the pin 5 is fitted. The moving handle 6 can be rotated around the pin 5 in the plane of the stationary part and it is continued in the clevis 7 having been lengthened beyond of the point of rotation formed by the pin; on the rounded end of clevis 7 there is a further bore receiving a pin 8 connected to the lower end of the arm 10, which is inducing the vertical motion of the structural part of the tool performing the effective work against the spring 9 being attached by its upper part to the same point of rotation. On the guide column 3, in the full length thereof, the groove 11 is provided, serving for the guidance of the positioning fork 13 pivotally connected to the arm 10 by means of a further pin 12 and shaped in the form of a trough on the top. The upper part with a dovetail profile enclosing the positioning fork 13 before and behind and being interconnected with screws, is connected to the arm 10 via the clevis 14 and pin 12. The lower end of the spring 9 is fixed in the bore having been formed in the nearly right angled bend of the stationary part 1 of the tool.

At the edge of the positioning fork 13 there is a rectangular extension piece 16 pulling-off the pieces cut to the profile from the knife 15. The knife 15 with its U-profile is fixed to the upper portion of the stationary part 1 also bent to U-profile, by means of screws. The moving handle 6 can be kept in a fixed and closed state, by using a latch 17 known in itself. The operation of the device results from its construction.

After having released the latch 17 the spring 9 is pulling the arm 10—being also fixed at the pin 8—downwards, while the moving handle 6 is turning around the pin 5 outwards. As a consequence, the handles separate, the clevis 14 holding the positioning fork 13 is guided in the groove 11 and is travelling downwards together with the positioning fork 13.

The understock is placed on the trough-shaped end of the positioning fork 13, simultaneously the moving handle 6 is pulled against the force of the spring 9. Under the influence of this action, the arm 10 is pressing the clevis 14 and the positioning fork 13 toward the knife 15, and the U-shaped cutting edge of the knife is cutting out the positive profile. After having repeatedly opened the shafts, the extension piece 16 is pulling-off the understrock from the knife.

To form the other piece of the graft, the graft is seized from the opposite side of the tool by means of the positioning fork 13, in this case the knife is cutting out a negative profile, which is also pulled-off from the knife by the extension piece 16.

Operation of the device requires a force of 4 kp, accordingly it can be actuated by a woman worker too.

The pieces having been cut to profile in the described manner can be accurately and closely fitted together, whereas their final fixation is requiring considerably less expenditure of work, than the usual grafting procedures. Accordingly, by the proper organization of the work, two workers following each other can perform a great deal of work on the spot by using the universal manual grafting device according to the invention.

I claim:

1. A cutting tool for grafting comprising first and second members pivotally interconnected at a common pivot, each member including a handle portion on one side of the pivot and a working portion on the other side, the working portion of the second member being connected with the handle portion of the first member via a spring and being also pivotally connected with one end of an arm whose other end is pivotally joined with a movable workpiece locating member slidably guided along the length of the working portion of the first member toward and away from a cutting edge attached to the first member.

2. A cutting tool for grafting according to claim 1, wherein a groove for slidably guiding the movable workpiece locating member is disposed along the length of the working portion of the first member.

3. A cutting tool for grafting according to claim 2, wherein the cutting edge is in line with the line of movement of the locating member and the groove is parallel thereto.

4. A cutting tool for grafting according to claim 1, wherein the workpiece locating member has a longitudinal extension on each side of the cutting edge for separating from the cutting edge pieces cut from the workpiece.

* * * * *